No. 857,286. PATENTED JUNE 18, 1907.
R. JENSEN.
SAFETY MECHANISM FOR HOISTING OR HAULING APPARATUS FOR MINES.
APPLICATION FILED DEC. 17, 1906.

3 SHEETS—SHEET 1.

Witnesses:
F. Ovendale
J. Scrimgeour

Inventor:
Ragnvald Jensen
by Chas. Ovendale
his Attorney.

No. 857,286. PATENTED JUNE 18, 1907.
R. JENSEN.
SAFETY MECHANISM FOR HOISTING OR HAULING APPARATUS FOR MINES.
APPLICATION FILED DEC. 17, 1906.

3 SHEETS—SHEET 3.

UNITED STATES PATENT OFFICE.

RAGNVALD JENSEN, OF EAST RAND, TRANSVAAL.

SAFETY MECHANISM FOR HOISTING OR HAULING APPARATUS FOR MINES.

No. 857,286.　　　Specification of Letters Patent.　　　Patented June 18 1907.

Application filed December 17, 1906. Serial No. 348,320.

*To all whom it may concern:*

Be it known that I, RAGNVALD JENSEN, a subject of the King of Norway, and a resident of East Rand, Transvaal, have invented certain new and useful Improvements in Safety Mechanism for Hoisting or Hauling Apparatus for Mines and the Like, of which the following is a specification.

This invention relates to safety devices or mechanism primarily designed for use on cages, skips or similar vehicles, employed in the shafts of mines for winding, hoisting or hauling purposes, in which the vehicle traverses guides, runners or skids in the shaft.

Although the invention is intended more particularly for use in vertical shafts it may be adapted for use in inclined or combined vertical and inclined shafts, the device or mechanism being arranged to operate on the guides, runners or skids or the rails traversed by the vehicle.

The invention may also be used with lifts, hoists, elevators or other like hoisting apparatus in which the cage, car or other vehicle traverses guides in the shaft or well.

The object of the invention is to provide a reliable safety device which will automatically come into operation in the event of the breaking of the hauling rope or in the event of the vehicle becoming unsupported in the shaft or well from any other cause.

The device operates to retard the movement of the falling vehicle and gradually bring it to rest, and thereby prevent the transmission of injurious shocks to occupants of the vehicle and also avoid damage either to the shaft or vehicle.

The device is adjustable so that the brake pressure, which is gradually applied, may be limited, and so enable the movement of the vehicle to be arrested within any predetermined suitable distance.

In the accompanying drawings I illustrate a practical embodiment of my invention in which it is shown applied to a mine cage designed to travel in a vertical shaft.

Figure 1:
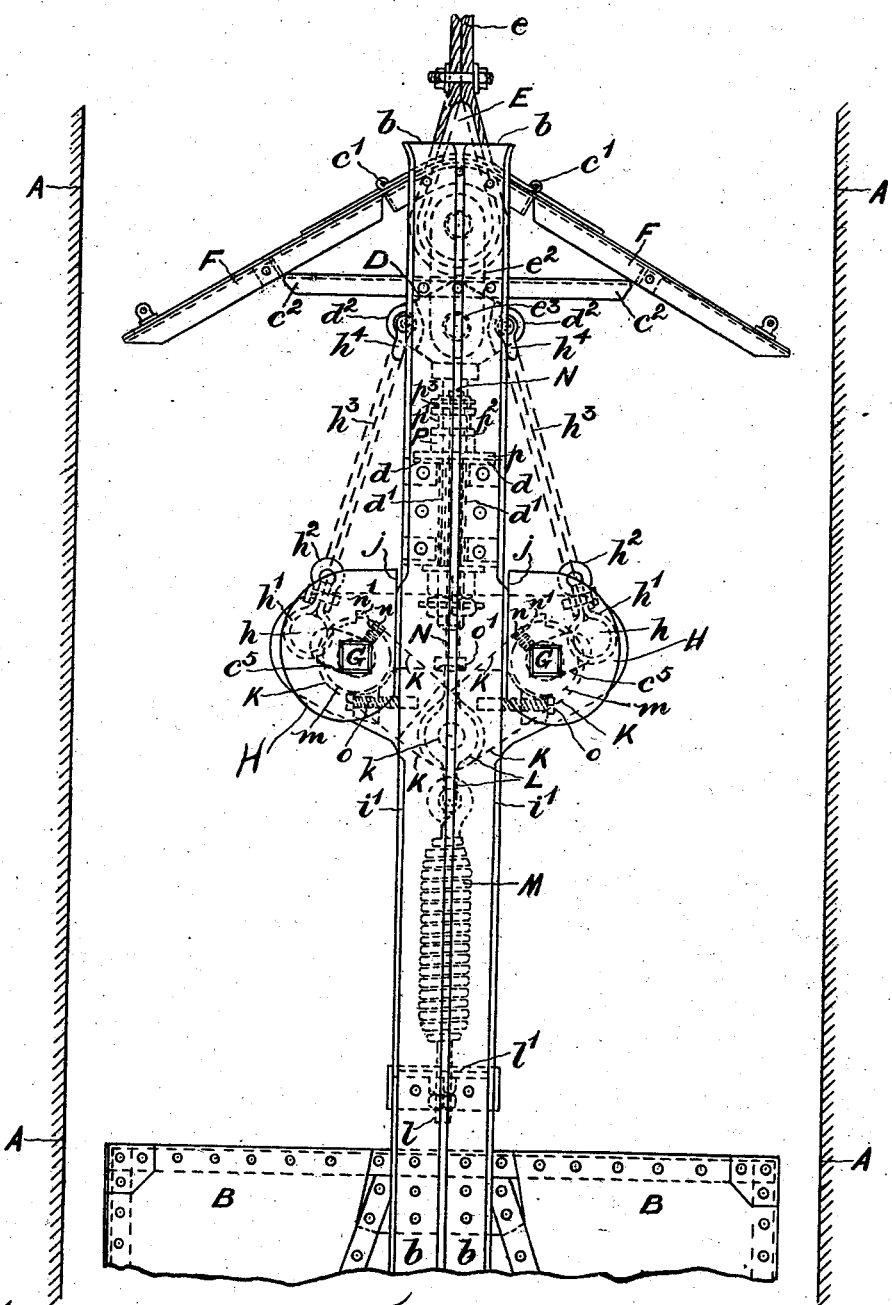
Figure 2:
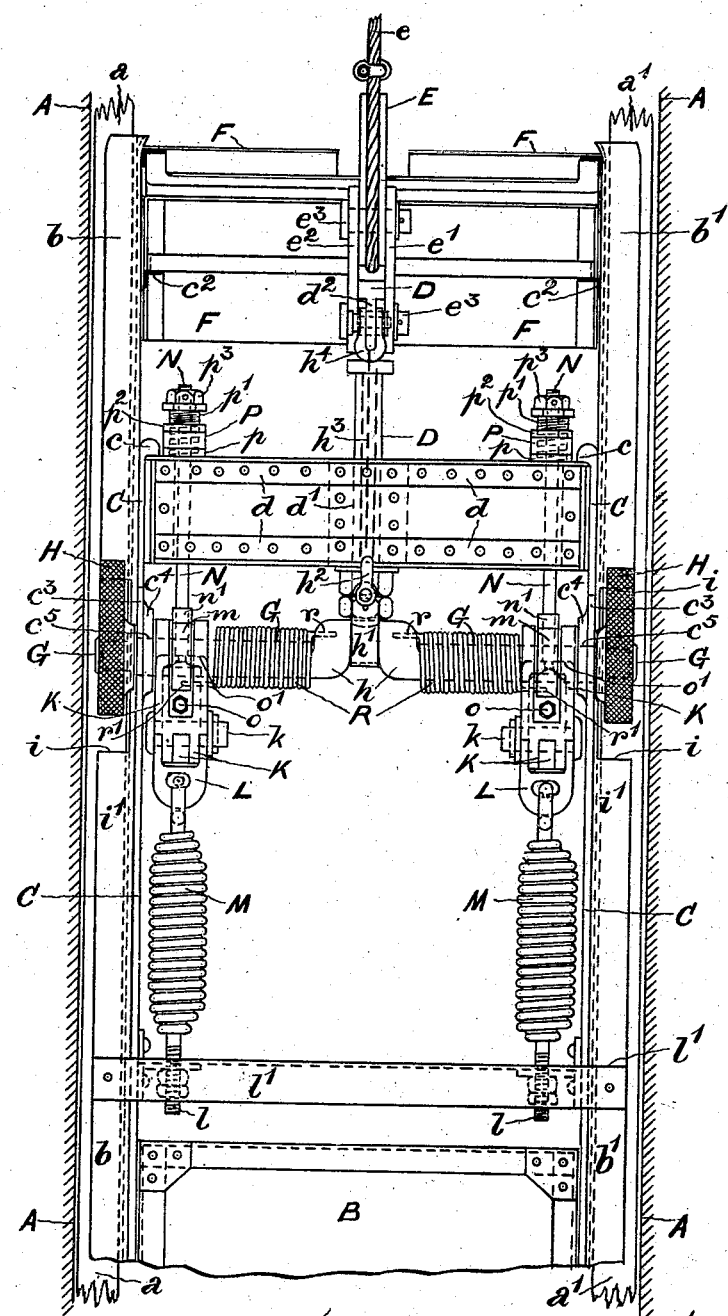

Figure 1 represents a side elevation of the upper portion of the vehicle with my invention applied thereto. Fig. 2 is an elevation at right angles to Fig. 1; and Fig. 3 is a plan with certain parts removed.

In the drawings A designates the walls or sides of the shaft and B the cage or vehicle. $a$ $a^1$ are the guides, runners or skids which serve to guide the vehicle as it ascends and descends the shaft. $b$ $b^1$ are the angle pieces or shoes fixed to the sides of the vehicle which slidably engage the sides of the guides $a$ $a^1$—see Fig. 3. The shoes $b$ $b^1$ extend for a suitable distance above the top of the cage. C are plates which constitute the drawbar, riveted or otherwise suitably fixed to opposite sides of the cage, to which plates the shoes $b$ $b^1$ are secured. These plates C extend for a suitable distance beyond the top of the cage and at their upper extremities are preferably constructed to form a ledge or projection $c$. Between the upper extremities of these two plates C and riveted thereto is the crosshead or upper transverse member $d$. D is the drawbolt or kingbolt, which in the customary manner, may be made of square section, adapted to slide within certain limits in a square hole $d^1$ in the crosshead $d$. To the upper extremity of the drawbolt D is connected the winding or hauling rope $e$. This connection is shown made through the medium of the thimble E, side plates $e^1$ $e^2$, and pins $e^3$. The upper end of the drawbolt D is shaped to provide two lateral projections or lugs $d^2$ for a purpose to be hereinafter explained. F is a hood or cover fixed to the upper extremities of the shoes $b$ $b^1$ and hinged at $c^1$, and $c^2$ are anglepieces serving as a stop or support for the cover F. These several parts do not in themselves constitute any feature of the present invention and they may be of the construction shown or of any other desired and suitable construction.

Figure 3:
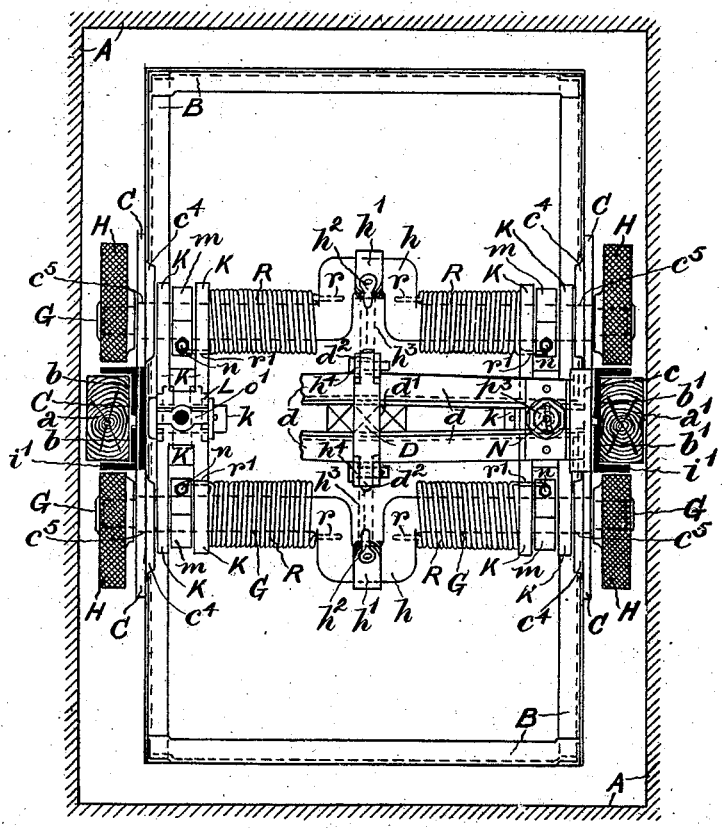

Each of the plates C is constructed with two lateral projections $c^3$ on which are formed bosses $c^4$, see Figs. 2 and 3. G are two horizontally disposed shafts which are revolubly supported in curved slots $c^5$ formed in the lateral projections $c^3$. In these slots $c^5$ said shafts G are capable of moving laterally away from or toward each other. The shafts G are constructed at the center with cranks $h$ and encircling each of the cranks $h$ is a loose collar $h^1$. One of these collars $h^1$ is attached, by means of shackle $h^2$, chain $h^3$ and shackle $h^4$, to one of the lateral projections or lugs $d^2$ on the drawbolt D, and the other collar, in like manner, is connected to the other lateral projection. When the weight of the vehicle is on the drawbolt D it assumes the position in which it is shown in the drawings with its lower extremity engaging the underside of the crosshead $d$. The cranks $h$ are shown in their corresponding positions. With the parts in these positions a portion of the weight of the vehicle is carried by the crosshead $d$ and a portion by the springs (R) of the safety device, hereinafter referred to.

H are four cams, one fixed to the outer extremity of each of the crank shafts G. These cams H are in alinement with the gaps or spaces $i$ formed by cutting out the side flange $i^1$ of the shoes $b$ $b^1$ so that said cams can contact directly with the sides of the guides or runners $a$ $a^1$. These cams H, which are shown in side elevation in Fig. 1, are constructed with flat faces $j$ which when the parts are in the position shown, lie parallel with and away from the sides of the runners $a$ $a^1$. The cams H can be made eccentric in the following manner:—The permissible angle between a normal to the curve of the working face of the cam at any point and a line joining the same point to the center of the shaft should be less than the angle corresponding to the friction (an angle whose tangent is equal to the co-efficient of friction) between the cams and the guides in the shaft. In this way when the cams first grip the guides they can overcome the friction of the shaft in its bearings and so drive themselves firmly against the guides. The face of the cam, where it comes into contact with the guide, may be made with a smooth or rough surface, or with very small teeth or projections. These teeth should not be larger than is necessary to increase the friction. For steel guides these cams are preferably made of hardened steel. For both wood and steel guides the permissible angle may decrease, as the radius of the cam face increases, so that when the cams have turned through a large arc the shafts will, for a given increase in the distance between them, turn through a greater angle than they do for the same increase of distance at the beginning of the grip.

The two shafts G are connected at each end by means of four bifurcated links K, loosely mounted thereon. The end of one of the shafts G passes through the bifurcated extremity of one of the links K and the corresponding extremity of the other shaft passes through the bifurcated extremity of another link. The other and free ends of each pair of links are connected by means of a pin $k$. The free end of one link is bifurcated and the other constructed with a tongue or projection fitting the bifurcation in the other link, the pin $k$ passing through them.

L are two shackles, one for each pair of links K, carried by the pins $k$ and fitting recesses in the free ends of the links K. To each of these shackles L is attached one end of a main helical or other suitable spring M. The other ends of the main springs M are attached by screwed bolts $l$ to a transverse beam $l^1$, or it may be to two brackets fixed to the shoes $b$ $b^1$ and plate C above the cage. The screwed bolts $l$ may be used as means for adjusting the tension of the two main springs M.

On the crank shafts G and in each of the bifurcations of the links K is mounted a collar $m$. $n$ are set-screws for fixing said collars $m$ to the shafts G. The angular position of the collars $m$ on the shafts G may be adjusted in order to attain the requisite pressure between the cams H and the guides $a$ $a^1$, the set screws $n$ serving as a means for fixing the same after adjustment. $o$ are set-screws screwed into the links K and $n^1$ are projections formed on the collars $m$ which by engaging the heads of the set-screws $o$ operate to limit the rotary movement of the shafts G. The adjustment may be effected by screwing the set-screws $o$ into or out of the holes in the links K to cause the projection $n^1$ on the collar $m$ to engage it sooner or later as may be requisite.

Instead of providing the collars $m$ with the projections $n^1$, the set-screws $n$ fixing said collars to their shafts G may serve as the stops, and instead of providing the adjustable buffers or set-screws $o$ the projections $n^1$ or set-screws $n$ may strike against the links K to limit the rotation of the crank shafts G. I prefer however to employ the set-screws $o$, as this permits of a more perfect adjustment of the desired pressure. Means may also be provided for regulating the minimum distance between the shafts G. In the arrangement shown these means consist of two bolts or rods N, one for each pair of links K. These rods N are vertically disposed and project through the ends of the crosshead $d$. At their lower extremities they are connected to a vertical extension $o^1$ of each of the shackles L which serve for connecting the free ends of each pair of links K to the main springs M. The upper ends of the rods N project through internally screwed sockets P which are fixed through flanges $p$ to the top of the crosshead $d$. Into each of the sockets P is screwed a bushing $p^1$ which is secured after adjustment by a lock-nut $p^2$. On the threaded upper extremity of each of the rods N is screwed a nut $p^3$ fixed by a split pin or otherwise. Adjustment is effected by screwing the bushing $p^1$ into or out of the socket P.

Round each end of the crank shafts G and on the inside of the links K is disposed a helical or other suitable spring R, one extremity $r$ of which is fixed to the crank $h$ and the other extremity $r^1$ into the link K fixed to the same end of the shaft G. These springs R are arranged in such a manner that they tend to rotate the cranks $h$ outward from their highest position, thereby producing a tension in the chains $h^3$ connecting the cranks $h$ to the drawbolt D. By arranging the springs R in this manner it allows the shafts G to turn through a large angle, as required by the shape of the cams H. The strength of these springs R may be so calculated as to produce a tension in the chains $h^3$, the component of which in the hauling rope $e$ is not more than a certain percentage of the effective weight of the cage. By effective weight I mean the dead weight minus the loss of weight caused by the friction against the guides and minus also the loss of weight due to the maximum acceleration attained through the descent of the cage. The difference between the effective weight of the cage and the component in the hauling rope $e$ from the tension in the chains $h^3$ caused by the springs R, provides a margin of safety to prevent the cams H acting prematurely. On the other hand the tension in the chains $h^3$ caused by the springs R, must be sufficient to insure the rapid action of the cams H, even though hampered by a long length of broken rope $e$ falling with the cage, which may be the case if a breakage occurs at a considerable depth in the shaft.

It will be obvious that instead of employing crank shafts G, eccentrics may be utilized in lieu of the cranks.

The device operates in the following manner:—In the event of the winding rope $e$ breaking, the springs R pull the drawbolt D and rope in a downward direction by turning the cranks $h$, and thereby cause the cams H to come into contact with and grip the guides $a$ $a^1$. As the cams H turn and press more closely against the guides $a$ $a^1$ the distance between the shafts G is gradually increased and consequently the links K and main springs M are lifted. This increases the tension of the springs M and to a much larger degree the tension in the links K, because the increase of the angle formed between the two links K increases the component forces in the direction of the links. In this manner the shafts G rotate until the cams H press sufficiently hard against the guides $a$ $a^1$ to cause friction which exceeds the dead weight of the cage and load. The shafts G continue to rotate and at the same time to travel outward or away from each other in the curved slots $c^5$ until the projections $n^1$ on the collars $m$ contacting with the set-screws $o$ in the links K prevent further motion of the shafts G. The set-screws $o$ as previously explained are so adjusted that the projections $n^1$ engage them only when the desired pressure between the cams H and guides $a$ $a^1$ has been attained. After the collars $m$ engage the stops $o$ the pressure remains constant. By adjusting the angular position of the collars $m$ and the initial tension of the springs M the cage can be brought to rest in any desired distance.

The position of the collars $m$ can be practically determined on temporary guides in the following manner:—The cams H are allowed to engage with the guides $a$ $a^1$ when the collars $m$ are loose, and the cage is gently lowered until the friction is sufficient to support it. The cage is then loaded until the total weight which the cams H carry is greater than the maximum working load. The cage having been loaded sufficiently, the collars $m$ are turned round on the shafts G until the projections $n^1$ contact with the adjustable buffers or set-screws $o$ and the collars $m$ are then fixed by the set-screws $n$.

What I claim as my invention and desire to protect by Letters Patent is:—

1. In a safety device such as described, the combination with the vehicle, guides and winding rope of two shafts revolubly supported by the vehicle, cams fixed on the extremities of said shafts and adapted to contact with the sides of the guides, links connecting the corresponding extremities of the two shafts, collars fixed to the shafts, main springs connected to the links, springs connected at one extremity to the links and at the other to the shafts, and connections between the shafts and rope which permit the shafts to rotate in the event of the vehicle becoming unsupported by the rope.

2. In a safety device such as described, the combination with the vehicle, guides and winding rope of two shafts capable of moving laterally or away from and toward each other and revolubly supported by the vehicle, cams fixed on the extremities of said shafts and adapted to contact with the sides of the guides, links connecting the corresponding extremities of the two shafts, collars fixed to the shafts, main springs connected to the links, springs connected at one extremity to the links and at the other to the shafts, and connections between the shafts and rope which permit the shafts to rotate in the event of the vehicle becoming unsupported by the rope.

3. In a safety device such as described, the combination with the vehicle, guides and winding rope of two shafts movable laterally or away from and toward each other and revolubly supported by the vehicle, cams fixed on the extremities of said shafts and adapted to contact with the sides of the guides, links connecting the corresponding extremities of the two shafts, collars fixed to the shafts, means for limiting the rotatory movement of said collars, main springs connected to the links, springs connected at one extremity to the links and at the other to the shafts, and connections between the shafts and rope which permit the shafts to rotate in the event of the vehicle becoming unsupported by the rope.

4. In a safety device such as described, the combination with the vehicle, guides and winding rope of two shafts movable laterally or away from and toward each other and revolubly supported by the vehicle, cams fixed on the extremities of said shafts and adapted to contact with the sides of the guides, links connecting the corresponding extremities of the two shafts, means for limiting the downward movement of the said links, collars fixed to the extremities of the shafts, main springs connected to the links, springs connected at one extremity to the links and at the other to the shafts, and connections between the shafts and rope which permit the shafts to rotate in the event of the vehicle becoming unsupported by the rope.

5. In a safety device such as described, the combination with the vehicle, guides and winding rope of two shafts movable laterally or away from and toward each other and revolubly supported by the vehicle, cams fixed on the extremities of said shafts and adapted to contact with the sides of the guides, links connecting the corresponding extremities of the two shafts, adjustable means for limiting the downward movement of said links, collars fixed to the shafts, adjustable means for limiting the rotary movement of said collars, main springs connected to the links, springs connected at one extremity to the links and at the other to the shafts, and connections between the shafts and rope which permit the shafts to rotate in the event of the vehicle becoming unsupported by the rope.

6. In a safety device such as described, the combination with the vehicle, guides and winding rope of two crank shafts revolubly mounted in curved elongated slots in the frame of the vehicle, two pairs of links connecting corresponding extremities of said shafts, main springs connected to the links, springs carried by the shafts which serve to rotate the shafts when the vehicle becomes unsupported, cams on the ends of the shafts adapted to contact with the guides, collars adjustably fixed on the shafts, means for limiting the rotary movement of said collars comprising a projection on the collar and a part screwed into the link to serve as a stop to be engaged by the projection aforesaid.

7. In a safety device such as described the combination with the vehicle, guides and winding rope of two crank shafts revolubly mounted in curved elongated slots in the frame of the vehicle, two pairs of links connecting corresponding extremities of said shafts, means for limiting the downward movement of said links, comprising screwed rods connected at their lower ends to the links, sockets, bushings screwed into the sockets, through which bushing the screwed rods project nuts screwed onto the rods above the bushings, and lock-nuts for the bushings, main springs connected to the links, springs carried by the shafts which serve to rotate the shafts when the vehicle becomes unsupported, cams on the ends of the shafts adaped to contact with the guides, and collars adjustably fixed on the crank shafts.

8. In a safety device such as described the combination with the vehicle, guides and winding rope of two crank shafts revolubly mounted in curved elongated slots in the frame of the vehicle, two pairs of links connecting corresponding extremities of said shafts, means for limiting the downward movement of said links, comprising screwed rods connected at their lower ends to the links, sockets, bushings screwed into the sockets, through which bushings the screwed rods project, nuts screwed onto the rods above the bushings, and lock-nuts for the bushings, main springs connected to the links, springs carried by the shafts which serve to rotate the shafts when the vehicle becomes unsupported, cams on the ends of the shafts adapted to contact with the guides, collars adjustably fixed on the shafts, means for limiting the rotary movement of said collars comprising a projection on the collar and a part screwed into the link to serve as a stop to be engaged by the projection aforesaid.

In witness whereof I have hereunto set my hand in the presence of two subscribing witnesses.

RAGNVALD JENSEN.

Witnesses:
CHAS. OVENDALE,
F. A. OVENDALE.